(12) United States Patent
Raak et al.

(10) Patent No.: US 11,599,898 B1
(45) Date of Patent: Mar. 7, 2023

(54) SHOPPER VALUATION SYSTEM AND RELATED METHODS

(71) Applicant: Inmar Clearing, Inc., Winston-Salem, NC (US)

(72) Inventors: Alise Raak, Winston-Salem, NC (US); Sylvain Mansier, Weston, MA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/744,657

(22) Filed: May 14, 2022

(51) Int. Cl.
 *G06Q 30/02* (2012.01)
 *G06Q 30/0207* (2023.01)
 *G06Q 30/0226* (2023.01)
 *G06Q 20/34* (2012.01)

(52) U.S. Cl.
 CPC ......... *G06Q 30/0224* (2013.01); *G06Q 20/34* (2013.01); *G06Q 30/0226* (2013.01)

(58) Field of Classification Search
 CPC . G06Q 30/0224; G06Q 30/0226; G06Q 20/34
 See application file for complete search history.

(56) References Cited

U.S. PATENT DOCUMENTS

| | | | |
|---|---|---|---|
| 8,505,813 B2 * | 8/2013 | Grossman | G06F 21/31 705/14.31 |
| 10,825,038 B2 | 11/2020 | Walz et al. | |
| 10,861,041 B2 | 12/2020 | Tietzen et al. | |
| 11,093,922 B2 * | 8/2021 | Cummins | G07G 1/0045 |
| 11,157,954 B1 * | 10/2021 | Belanger | G06Q 30/0201 |
| 2013/0191204 A1 * | 7/2013 | Kingsborough | G06Q 20/102 705/16 |
| 2021/0264467 A1 * | 8/2021 | Boal | G06Q 30/0211 |
| 2022/0180389 A1 * | 6/2022 | Yates | G06Q 30/0222 |

* cited by examiner

Primary Examiner — Azam A Ansari
(74) Attorney, Agent, or Firm — Allen, Dyer, Doppelt + Gilchrist, P.A.

(57) ABSTRACT

A shopper valuation system may include a user device associated with a given shopper, and a shopper valuation server. The server may obtain historical purchase data associated with shoppers at a given retailer, apply a machine learning algorithm to determine a corresponding shopper value for each of the shoppers, and obtain historical purchase data associated with the given shopper at the given retailer. The server may apply the algorithm to determine a shopper value for the given shopper based upon the historical purchase data for the shoppers and, the corresponding shopper values for the shoppers, and update the machine learning algorithm based upon the shopper value for the given shopper. The server may also communicate a notification to the user device soliciting the given shopper to enroll in a retailer loyalty program for payment to the given shopper of the shopper value for the given shopper.

21 Claims, 5 Drawing Sheets

```
                              ┌─────────┐
                         60─► │  START  │─62
                              └────┬────┘
                                   ▼                                      ┌─64
┌──────────────────────────────────────────────────────────────────────────┐
│ OBTAIN HISTORICAL PURCHASE DATA ASSOCIATED WITH A PLURALITY OF SHOPPERS  │
│ AT A GIVEN RETAILER (E.G., PAYMENT TYPE, PAYMENT CARD BRAND, PRODUCT     │
│ CATEGORY)                                                                │
└──────────────────────────────────────┬───────────────────────────────────┘
                                       ▼                              ┌─66
┌──────────────────────────────────────────────────────────────────────────┐
│ APPLY A MACHINE LEARNING ALGORITHM TO DETERMINE A CORRESPONDING SHOPPER  │
│ VALUE FOR EACH OF THE PLURALITY OF SHOPPERS                              │
└──────────────────────────────────────┬───────────────────────────────────┘
                                       ▼                              ┌─68
```

Flowchart 60:

- 62 START
- 64 OBTAIN HISTORICAL PURCHASE DATA ASSOCIATED WITH A PLURALITY OF SHOPPERS AT A GIVEN RETAILER (E.G., PAYMENT TYPE, PAYMENT CARD BRAND, PRODUCT CATEGORY)
- 66 APPLY A MACHINE LEARNING ALGORITHM TO DETERMINE A CORRESPONDING SHOPPER VALUE FOR EACH OF THE PLURALITY OF SHOPPERS
- 68 OBTAIN HISTORICAL PURCHASE DATA ASSOCIATED WITH A GIVEN SHOPPER AT THE GIVEN RETAILER (E.G., PAYMENT TYPE, PAYMENT CARD BRAND, PRODUCT CATEGORY)
- 70 APPLY THE MACHINE LEARNING ALGORITHM TO DETERMINE A SHOPPER VALUE FOR THE GIVEN SHOPPER BASED UPON THE HISTORICAL PURCHASE DATA FOR THE GIVEN SHOPPER AND THE HISTORICAL PURCHASE DATA FOR THE PLURALITY OF SHOPPERS (E.G., BASED UPON THE PAYMENT TYPE, PAYMENT CARD BRAND, PRODUCT CATEGORY)
- 72 UPDATE THE MACHINE LEARNING ALGORITHM BASED UPON THE SHOPPER VALUE FOR THE GIVEN SHOPPER
- 74 GENERATE AND COMMUNICATE A NOTIFICATION TO THE USER DEVICE SOLICITING THE GIVEN SHOPPER TO ENROLL IN A RETAILER LOYALTY PROGRAM FOR PAYMENT (E.G., IN THE FORM OF A DIGITAL COUPON HAVING A REDEEMABLE VALUE TOWARD A PURCHASE AT THE GIVEN RETAILER) TO THE GIVEN SHOPPER OF THE SHOPPER VALUE FOR THE GIVEN SHOPPER
- 76 ACCEPT OR DENY?
  - ACCEPT → 78 COOPERATE WITH THE GIVEN SHOPPER, VIA THE USER DEVICE, TO ENROLL THE GIVEN SHOPPER IN THE RETAILER LOYALTY PROGRAM
  - → 80 GENERATE A SHOPPER IDENTIFIER FOR THE LOYALTY ACCOUNT FOR THE GIVEN SHOPPER
  - → TO FIG. 4B
  - DENY → TO FIG. 4B

SHOPPER VALUATION SYSTEM AND RELATED METHODS

TECHNICAL FIELD

The present invention relates to the field of retail data processing, and, more particularly, to shopper valuations and related methods.

BACKGROUND

A loyalty program is a marketing strategy that encourages shoppers to continue to purchase items or services from one or more retailers, for example. A loyalty program typically involves the retailer or other entity that operates or manages the loyalty program to set up an account for a user. Rewards are added or associated with the loyalty account, for example, based upon purchases made at the retailer.

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

U.S. Pat. No. 10,861,041 to Tietzen et al. is directed to a loyalty system. In some loyalty programs, merchants may be required to pay a set monthly or periodic fee to participate in or otherwise be associated with the loyalty program. The loyalty system and/or transaction processing system can charge an incremental fee based on a profile group of the customers the merchant can target with rewards/offers/incentives/etc. in the loyalty system. For example, if the merchant wishes to target a specific customer profile group, the merchant may be provided access to generate rewards for those customers and can incur an incremental transaction fee any time a customer in the profile group completes a transaction with the merchant. This fee may apply to any customer in the profile group irrespective of whether a reward was actually offered to the specific customer involved in the transaction.

SUMMARY

A shopper valuation system may include a user device associated with a given shopper, and a shopper valuation server. The shopper valuation server may be configured to obtain historical purchase data associated with a plurality of shoppers at a given retailer, and apply a machine learning algorithm to determine a corresponding shopper value for each of the plurality of shoppers at the given retailer. The shopper valuation server may also be configured to obtain historical purchase data associated with the given shopper at the given retailer, and apply the machine learning algorithm to determine a shopper value for the given shopper based upon the historical purchase data for the given shopper, the corresponding shopper values for each of the plurality of shoppers, and the historical purchase data for the plurality of shoppers. The shopper valuation server may also be configured to update the machine learning algorithm based upon the shopper value for the given shopper, and generate and communicate a notification to the user device soliciting the given shopper to enroll in a retailer loyalty program for payment to the given shopper of the shopper value for the given shopper.

The historical purchase data for the plurality of shoppers and the given shopper each may include a payment type for each purchase transaction. The shopper valuation server may be configured to determine the shopper value for the given shopper based upon the payment type, for example.

The payment type may include a payment card having a brand associated therewith. The shopper valuation server may be configured to determine the shopper value for the given shopper based upon the brand of the payment card, for example.

The historical purchase data for the plurality of shoppers and the given shopper each may include a product category associated with each product purchased. The shopper valuation server may be configured to determine the shopper value based upon the product categories, for example.

The payment may be in the form of a digital coupon having a redeemable value toward a purchase at the given retailer, for example. The shopper valuation server may be configured to communicate the payment to the given shopper based upon enrollment of the given shopper in the retailer loyalty program.

The shopper valuation server may be configured to add the shopper value to a digital wallet associated with the given shopper. The shopper valuation server may be configured to generate a shopper identifier for a loyalty account associated with the given shopper based upon enrollment of the given shopper in the retailer loyalty program, and assign the shopper value for the given shopper to the loyalty account based upon the shopper identifier, for example.

A method aspect is directed to a method of valuating a shopper may include using a shopper valuation server to obtain historical purchase data associated with a plurality of shoppers at a given retailer, and apply a machine learning algorithm to determine a corresponding shopper value for each of the plurality of shoppers at the given retailer. The method may also include using the shopper valuation server to obtain historical purchase data associated with a given shopper at the given retailer, apply the machine learning algorithm to determine a shopper value for the given shopper based upon the historical purchase data for the given shopper, the corresponding shopper values for each of the plurality of shoppers, and the historical purchase data for the plurality of shoppers, and update the machine learning algorithm based upon the shopper value for the given shopper. The method may also include using the shopper valuation server to generate and communicate a notification to a user device associated with the given shopper soliciting the given shopper to enroll in a retailer loyalty program for payment to the given shopper of the shopper value for the given shopper.

A computer readable medium aspect is directed to a non-transitory computer readable medium for valuating a shopper. The non-transitory computer readable medium includes computer executable instructions that when executed by a processor cause the processor to perform operations. The operations may include obtaining historical purchase data associated with a plurality of shoppers at a given retailer, applying a machine learning algorithm to determine a corresponding shopper value for each of the plurality of shoppers at the given retailer, and obtaining historical purchase data associated with the given shopper at the given retailer. The operations may also include applying the machine learning algorithm to determine a shopper value for the given shopper based upon the historical purchase data for the given shopper, the corresponding shopper values for each of the plurality of shoppers, and the historical purchase data for the plurality of shoppers. The operations may further include updating the machine learning algorithm based upon the shopper value for the given shopper, and generating and communicating a notification to the user device soliciting the given shopper to enroll in a retailer loyalty program for payment to the given shopper of the shopper value for the given shopper.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
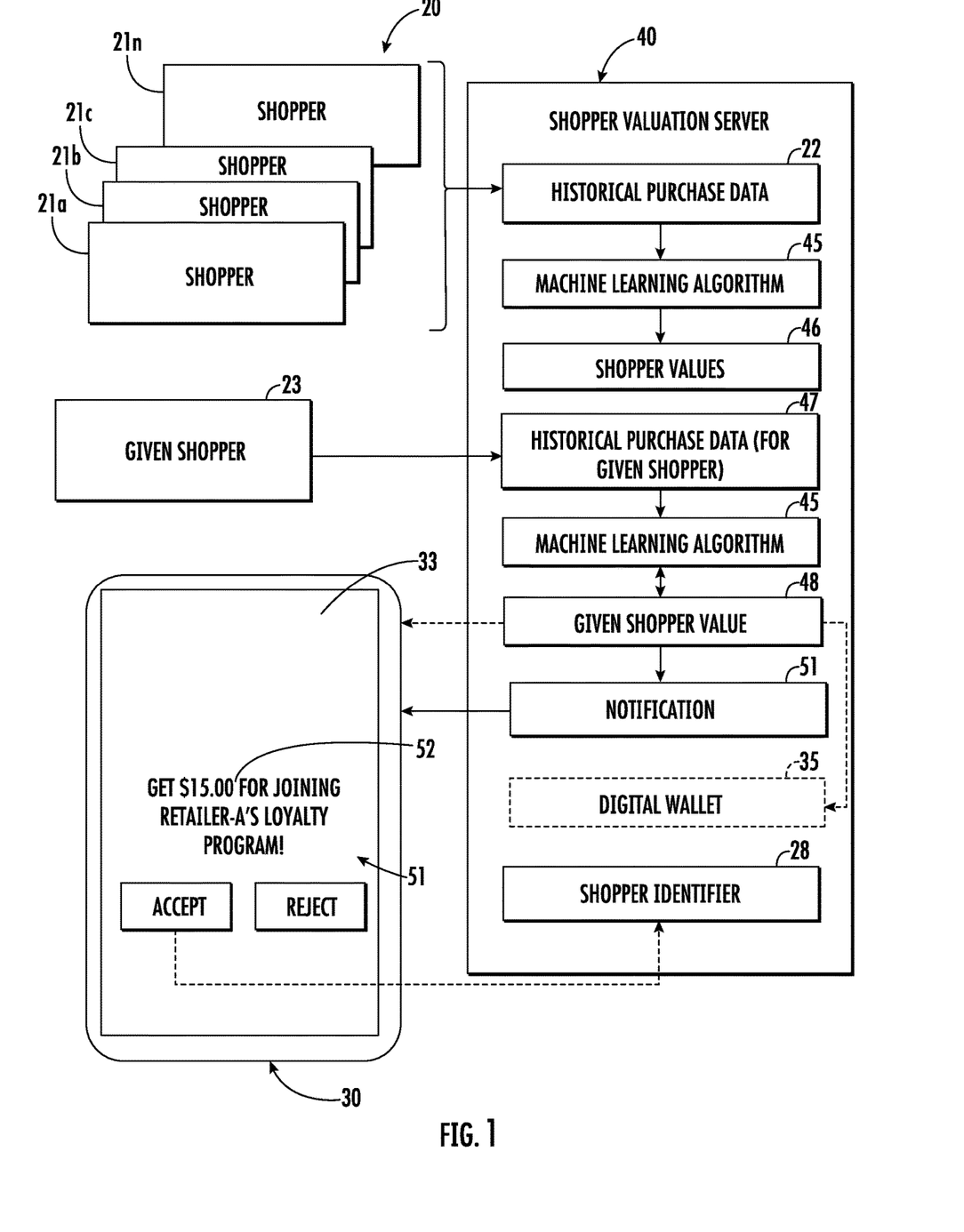
FIG. 1 is a schematic diagram of a shopper valuation system in accordance with an embodiment.
Figure 2:
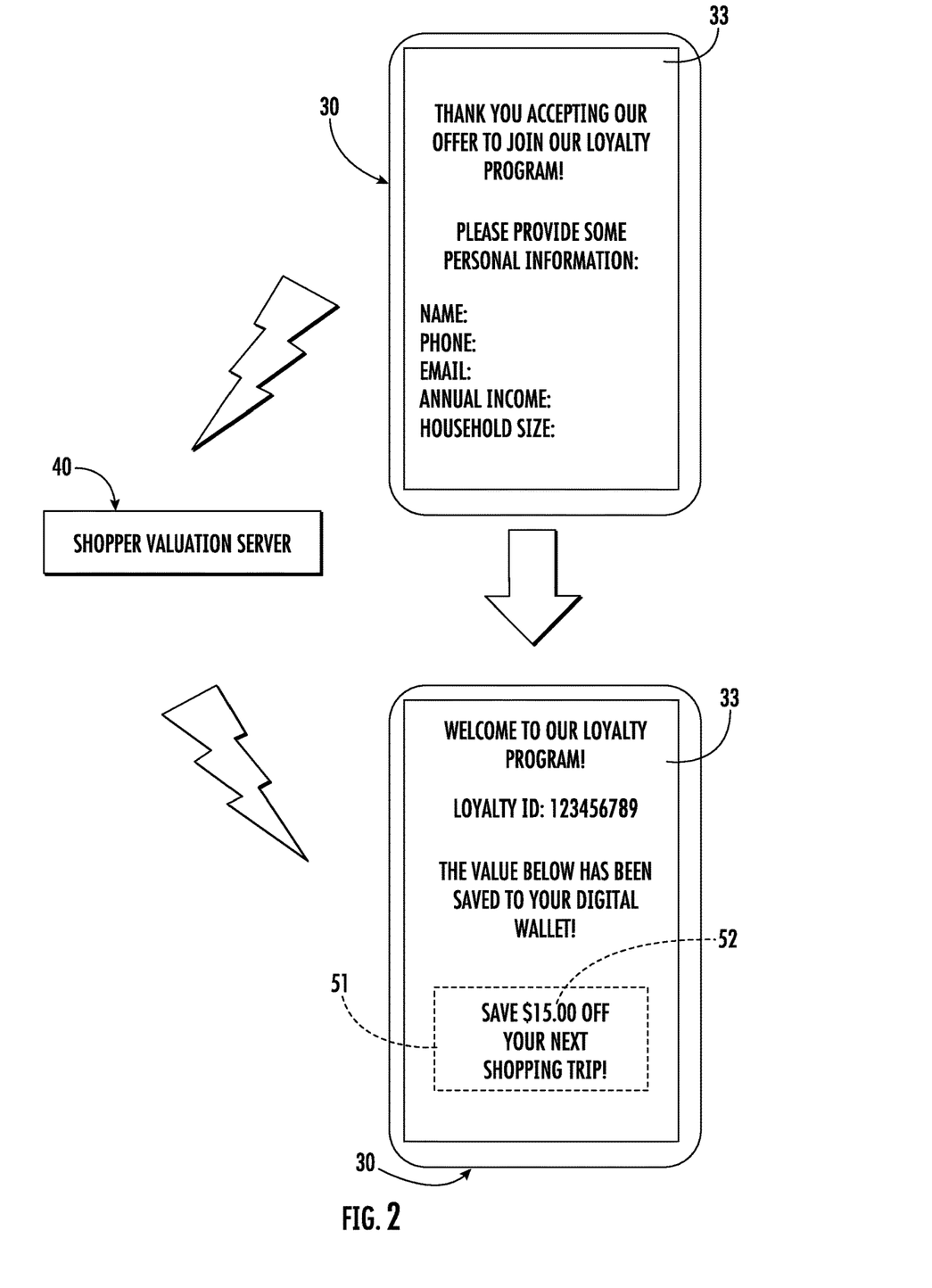
FIG. 2 is a diagram illustrating the display of the user device of FIG. 1 during an enrollment and communication of payment.

Referring initially to FIGS. 1 and 2, a shopper valuation system 20 includes a user device 30 associated with a given shopper 23, for example. The user device 30 is illustratively in the form of a smartphone or mobile wireless communications device. Of course, the user device 30 may be in the form of another type of device, for example, a tablet computer, wearable computer, personal computer, or laptop computer.

Figure 3:
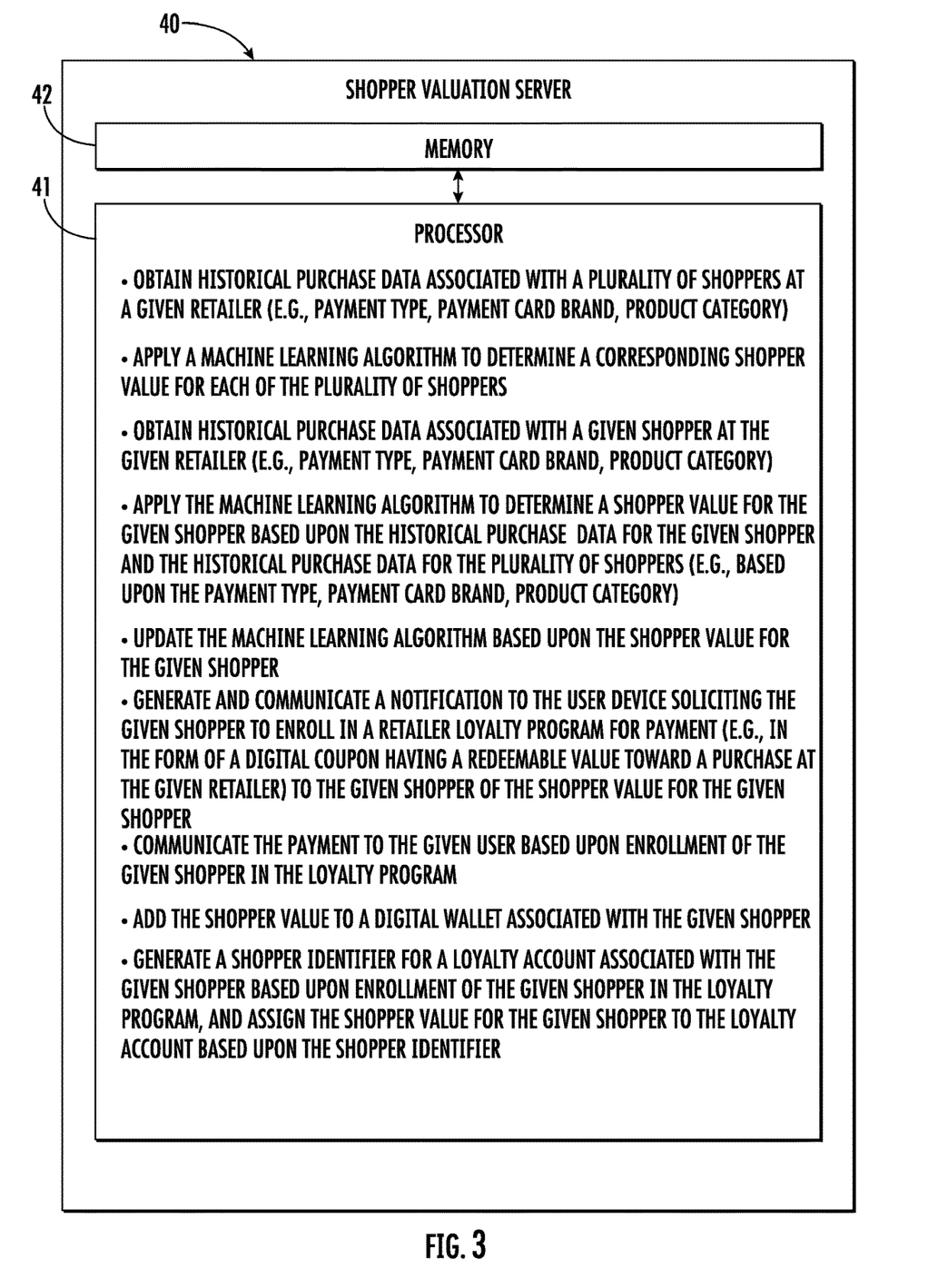
FIG. 3 is a block diagram of the shopper valuation server of FIG. 1.

The shopper valuation system 20 also includes a shopper valuation server 40. The shopper valuation server 40 includes a processor 41 and an associated memory 42. While operations of the shopper valuation server 40 are described herein, those skilled in the art will appreciate that the processor 41 and the memory 42 cooperate to perform the operations of the shopper valuation server described herein.

Figure 4A:
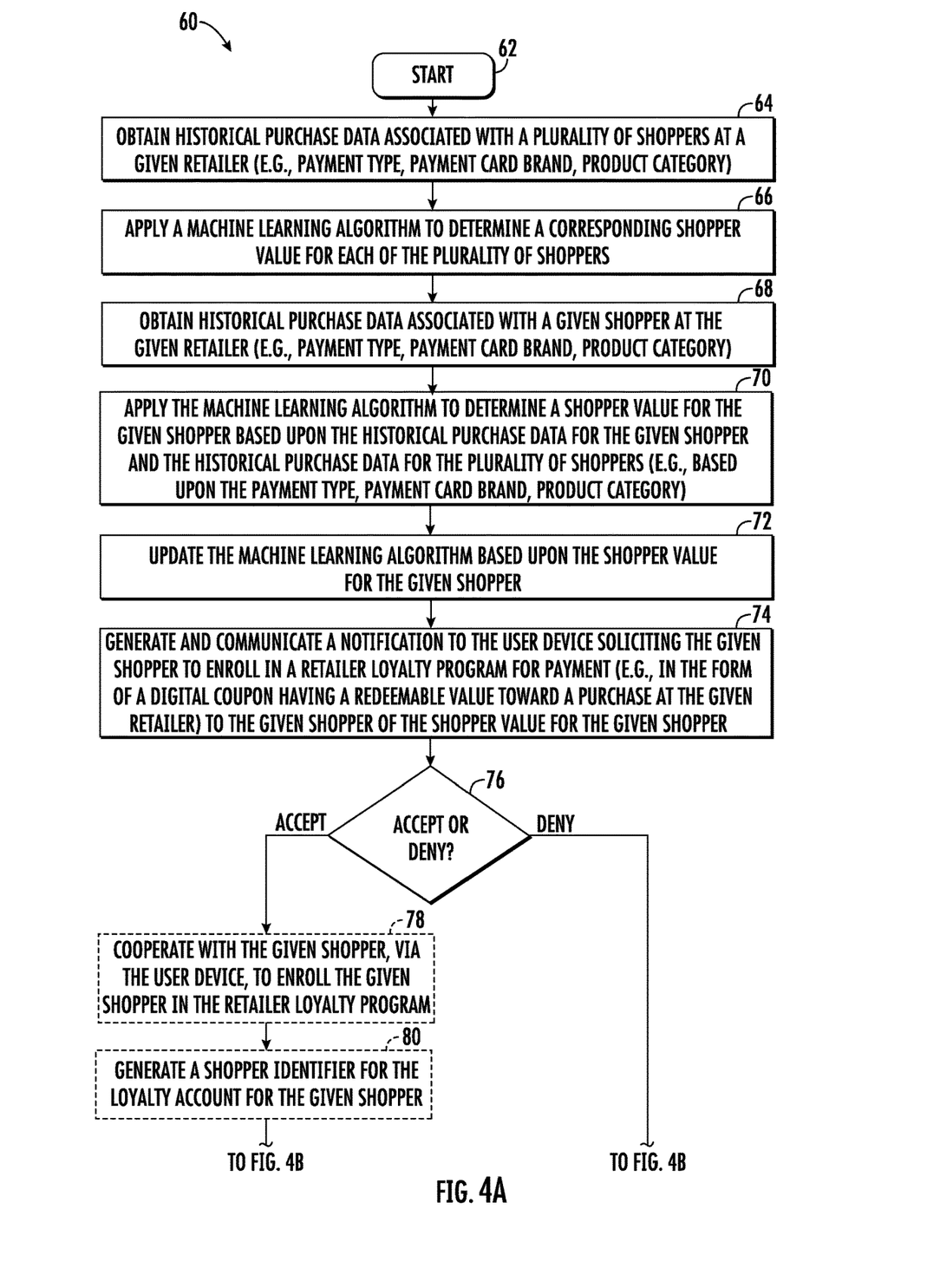
FIGS. 4A and 4B are flow diagrams illustrating operation of the shopper valuation server of FIG. 1.
Figure 4B:
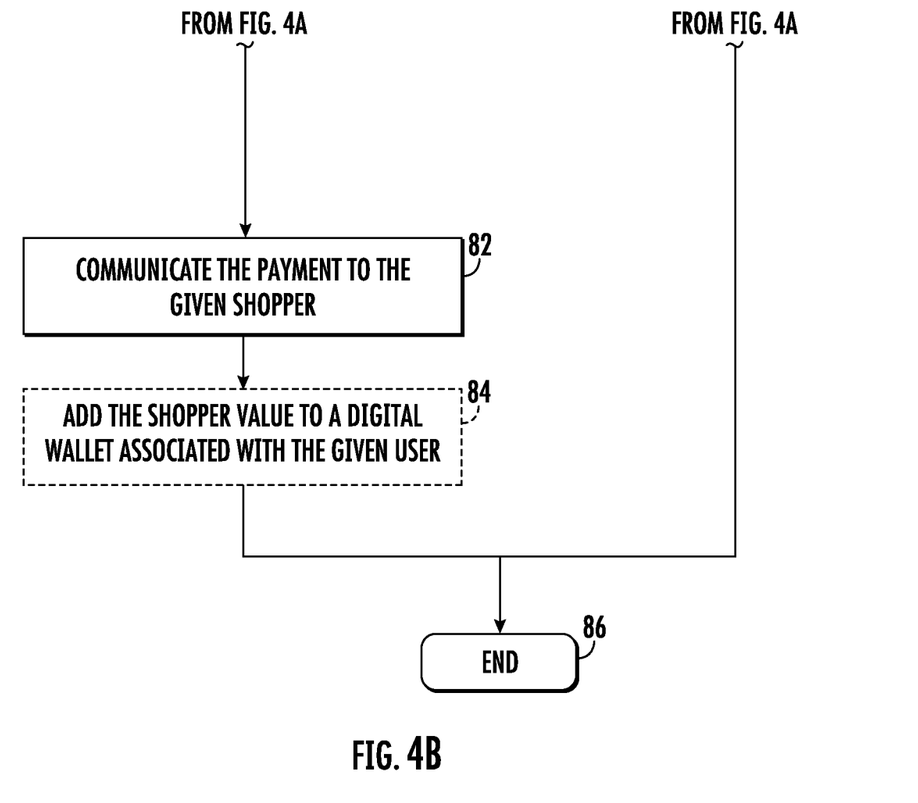

Referring now to the flowchart 60 in FIGS. 4a and 4b, beginning at Block 62, operations of the shopper valuation server 40 will now be described. At Block 64, the shopper valuation server 40 obtains historical purchase data 22 that is associated with a plurality of shoppers 21a-21n at a given retailer. The historical purchase data 22 may be obtained in batches at desired intervals from the retailer. For example, the historical purchase data 22 may be stored by the retailer and updated as products are purchased either or both of online and in-store (e.g., at a POS terminal, as products for purchase are being scanned). The stored historical purchase data 22 may be communicated to the shopper valuation server 40 daily or at desired intervals. In some embodiments, the retailer may communicate purchase data as products are being purchased either or both of online and in-store. For example, as orders are placed and/or products are being scanned at checkout at a POS terminal or at completion of a sale at the POS terminals at the retailer, the historical purchase data 22 may be communicated to the shopper valuation server 40 or obtained by the shopper valuation server.

The historical shopping data 22 may include historical shopping data across different locations (online, brick-and-mortar, geographic locations) of a given retailer. The historical shopping data 22 may include payment type data, for example, indicate whether the user paid by cash, credit card, debit card, gift card, electronic benefits card, etc. The historical shopping data 22, when, for example, payment is made via a payment card, may include which type, brand, or issuer of payment card is being used. As will be appreciated by those skilled in the art, different cards generally have different fee structures associated therewith. For example, a certain payment card may charge the user an annual fee and charge the retailer or merchant a higher processing fee relative to other brands or cards or card issuers. In such cases, the payment cards with the higher fees may be associated with more affluent shoppers, for example, as will be described in further detail below.

The historical shopping data 22 may also include a product category associated with each product purchased by each of the shoppers 21a-21n. For example, such categories, may include baby products, products associated with a special diet (e.g., gluten free), meats, dairy, brand v. generic, etc. A given product may be associated with more than one category, for example, and may be identified based upon one or more segments of a unique identifier associated with the given products, such as, for example, a uniform product code (UPC), or other identifier.

The shopper valuation server 40 applies a machine learning algorithm 45 to determine corresponding shopper value 46 for each of the shoppers 21a-21n (Block 66). More particularly, the shopper valuation server 40 accepts as input to the machine learning algorithm 45 the historical purchase data 22 associated with the shoppers 21a-21n and outputs a value 46. As historical purchase data 22 is obtained, for example, on an on-going basis, with each purchase, or as each product is being purchased, the machine learning algorithm 45 is updated so that the shopper values 46 associated with the shoppers 21a-21n are updated. The shopper values 46 represent a value of each shopper 21a-21n to the given retailer and may be represented by a dollar amount and may be determined based upon the product categories and payment type, payment card type, or brand. For example, a given shopper may be worth $10.00 to the retailer. Of course, the value may be represented in other and/or additional ways, for example, a numerical scale (e.g., 1-10 with 1 being a lowest value and 10 being a highest value). The machine learning algorithm 45 may learn using artificial neural networks, deep learning, decision tree learning, support vector machines, regression analysis, and/or Bayesian networks, for example.

In embodiments where the shopper valuation server 40 obtains shopper demographic or personal data, that data may also be used or provided as an input to the machine learning algorithm 45. Shopper demographic or personal data may include name, address, phone number, email address, income and spending levels, family size, etc.

At Block 68, the shopper valuation server 40 obtains historical purchase data 47 associated with the given shopper 23. The historical purchase data 47 associated with the given shopper 23 may include the same or similar data as the historical purchase data 22 for the other shoppers 21a-21n, such as, for example, a payment type or card brand for each transaction, a product category, etc., as described above with respect to the historical purchase data 22 for the other shoppers.

The shopper valuation server 40, at Block 70, applies the machine learning algorithm 45 to determine a shopper value 48 for the given shopper based upon the historical purchase data 47 for the given shopper 23 and the historical purchase data 22 for the other shoppers 21a-21n. The shopper valuation server 40 may determine the shopper value 48 for the given shopper 23 based upon the payment type, e.g., the brand of payment card, and the product categories. More particularly, the machine learning algorithm 45 accepts as input the historical purchase data 22, 47 for all shoppers 21a-21n and the given shopper 23, and the payment type, e.g., the brand of payment card, and the product categories, and generates as an output, the shopper value 48 for the given shopper.

More particularly, in a given implementation example, the shopper valuation server 40 may create or generate groupings of shopper values that represent different shopper groups. For example, a given shopper value or group or range of shopper values 46 may represent shoppers that, as determined by the machine learning algorithm 45, are similar. Such shoppers may be determined to be more affluent as determined by the payment card and/or the amount of purchases in both terms of quantity and value and may thus have a higher shopper value 46. In an exemplary implementation, shoppers that use a payment card with a higher annual fee and/or a tiered by income, invitation only payment card, may be determined to have a higher shopper value 46.

The shopper valuation server 40 uses the machine learning algorithm 45 to determine where or which grouping the given shopper most likely represented, for example. In some embodiments, the shopper valuation server 40 may directly determine the shopper value 48 for the given shopper 23 using the machine learning algorithm 45 as applied to the given shopper.

Once the shopper value 48 for the given shopper 23 is determined or the given shopper is grouped to a most similar grouping of the shopper values 46 for the other shoppers 21a-21n, the shopper valuation server 40 updates the machine learning algorithm 45 based upon the shopper value for the given shopper or assignment of the given shopper to the most similar shopper value group (Block 72). In other words, the shopper valuation server 40 updates the machine learning algorithm 45 so that further given shoppers can be more accurately assigned a shopper value.

At Block 74, the shopper valuation server 40 generates and communicates a notification 51 to the user device 30. The notification 51 may be displayed on the display 33 of the user device 30, and solicits the given shopper 23 to enroll in a retailer loyalty program for, e.g., in exchange for, payment 52 to the given shopper of the shopper value 48 for the given shopper. In other words, the notification 51 asks the given shopper 23 if he or she is willing to join the loyalty program of the given retailer (Block 76), and when so, the retailer will pay the given shopper the shopper value 48 associated with the given shopper. Indeed, for the exchange to be offered, it is desirable that the given shopper 23 not already be part of the retailer loyalty program. In some embodiments, the given shopper 23 may be part of the retailer loyalty program, and the shopper value 48 may be offered to further engage the given shopper, for example, by providing additional information to the given retailer. The notification 51 may be in the form of a text or multimedia message to the user device 30, an email retrievable via the user device, and/or a notification from, for example, an application on the user device associated with the given retailer.

Those skilled in the art will appreciate that the given shopper 23, while operating and using an application associated with the given retailer, may not be part of the retailer loyalty program. In other words, the given shopper 23 may have a username and password for accessing an application or website associated with the given shopper, or may access the application as a guest, even though the given shopper is not part of the retailer loyalty program. Accordingly, the given retailer may already have obtained information serving the basis for communicating the notification 51. More particularly, the shopper valuation server 40 may communicate the notification 51 based upon information associated with the payment type, for example, an email address, phone number (for messages), that may be obtained from previous transactions or purchases, and/or previous interactions with the website or application associated with the given retailer.

The payment 52 may be in the form of a digital promotion or coupon, for example, and may have a redeemable value associated therewith. The redeemable value may be redeemable toward a purchase at the given retailer. In some embodiments, the digital coupon 52 may be redeemable toward a category of products, a given brand or products, and/or may be based upon the historical purchase data 47 associated with the given shopper 23. For example, if the given shopper 23 typically purchases baby products, the given shopper may receive a digital promotion 52 applicable to baby products, while if the given shopper typically purchases milk and eggs, the digital promotion may be redeemable toward those products. In contrast, in some embodiments, the digital promotion 52 may be redeemable toward purchase of a product that is not typically purchased by the given shopper 23, and/or may be a competitor brand product to that typically purchased by the given shopper.

The given shopper 23 is prompted, at Block 76, to join the retailer loyalty program and may accept or deny the request to join the retailer loyalty program. When the given shopper 23 denies the request to join the retailer loyalty program at Block 76, operations may end at Block 86. Alternatively, the shopper valuation server 40 may increase the shopper value 48 and communicate the increased shopper value to the given shopper 23 via the user device 30. The updated shopper value may be obtained based upon the machine learning algorithm 45 as described below.

When, at Block 76, the given shopper 23 accepts the offer to join the retailer loyalty program (FIG. 2), the shopper valuation server 40 may cooperate with the given shopper 23, for example, via the user device 30, to enroll the given shopper in the retailer loyalty program (Block 78). Enrollment may include, for example, providing contact and demographic information, brand preferences, household income, preferred retailer location(s), preferred shopping and payment methods, etc. Upon enrollment, the shopper valuation server 40 may also generate a shopper identifier 28 for the newly created loyalty account associated with the given shopper 23 (Block 80).

Acceptance or denial may be provided to the machine learning algorithm 45 as input. The machine learning algorithm 45 may thus be updated based upon the acceptances and denials. For example, denials may train the machine learning algorithm 45 that the shopper value be increased to gain acceptance and vice versa, for example, to obtain lowest shopper value that will result in an acceptance.

Upon enrollment at Blocks 78 and 80, the shopper valuation server 40 may communicate the payment 52 to the given shopper 23 (FIG. 2) (Block 82). More particularly, the shopper valuation server 40 may assign the shopper value 48 for the given shopper 23 to the loyalty account based upon the shopper identifier 28 (e.g., assign the shopper value to the given shopper). In some embodiments, the shopper valuation server 40 may add the shopper value 48 to a digital wallet 35 associated with the given shopper 23 (Block 84). The digital wallet 35 may have been setup or established based upon enrollment of the given shopper 23 in the retailer loyalty program. The digital wallet 35 may also store digital promotions or coupons to be used or redeemed by the given shopper 23 at the given retailer, for example, during a purchase transaction, for example, during an online purchase, or in-store at a POS terminal. Operations end at Block 86.

A method aspect is directed to a method of valuating a shopper includes using a shopper valuation server 40 to obtain historical purchase data 22 associated with a plurality of shoppers 21a-21n at a given retailer, and apply a machine learning algorithm 45 to determine a corresponding shopper value 46 for each of the plurality of shoppers at the given retailer. The method also includes using the shopper valuation server 40 to obtain historical purchase data 47 associated with a given shopper 23 at the given retailer, apply the machine learning algorithm 45 to determine a shopper value 48 for the given shopper based upon the historical purchase data for the given shopper, the corresponding shopper values 46 for each of the plurality of shoppers 21a-21n, and the historical purchase data for the plurality of shoppers 22, and update the machine learning algorithm based upon the shopper value for the given shopper. The method also includes using the shopper valuation server 40 to generate and communicate a notification 51 to a user device 30 associated with the given shopper 23 soliciting the given shopper to enroll in a retailer loyalty program for payment 52 to the given shopper of the shopper value 48 for the given shopper.

A computer readable medium aspect is directed to a non-transitory computer readable medium for valuating a shopper. The non-transitory computer readable medium includes computer executable instructions that when executed by a processor 41 cause the processor to perform operations. The operations include obtaining historical purchase data 22 associated with a plurality of shoppers 21a-21n at a given retailer, applying a machine learning algorithm 45 to determine a corresponding shopper value 46 for each of the plurality of shoppers at the given retailer, and obtaining historical purchase data 47 associated with the given shopper 23 at the given retailer. The operations also include applying the machine learning algorithm 45 to determine a shopper value 48 for the given shopper 23 based upon the historical purchase data 47 for the given shopper, the corresponding shopper values 46 for each of the plurality of shoppers 21a-21n, and the historical purchase data 22 for the plurality of shoppers. The operations further include updating the machine learning algorithm 45 based upon the shopper value 48 for the given shopper 23, and generating and communicating a notification 51 to the user device 30 soliciting the given shopper to enroll in a retailer loyalty program for payment 52 to the given shopper of the shopper value for the given shopper.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A shopper valuation system comprising:
a user device associated with a given shopper; and
a shopper valuation server configured to
obtain historical purchase data associated with a plurality of shoppers at a given retailer,
apply a machine learning algorithm to determine a corresponding shopper value for each of the plurality of shoppers at the given retailer, each shopper value being a dollar value representation of a value of the corresponding shopper to the given retailer,
obtain historical purchase data associated with the given shopper at the given retailer,
apply the machine learning algorithm to determine a shopper value for the given shopper based upon the historical purchase data for the given shopper, the corresponding shopper values for each of the plurality of shoppers, and the historical purchase data for the plurality of shoppers,
update the machine learning algorithm based upon the shopper value for the given shopper to train the machine learning algorithm to assign shopper values to further given shoppers,
generate and communicate a notification to the user device soliciting the given shopper to accept or deny enrollment in a retailer loyalty program for payment to the given shopper of the shopper value for the given shopper,
generate a shopper identifier for a loyalty account associated with the given shopper based upon enrollment of the given shopper in the retailer loyalty program, and assign the shopper value for the given shopper to the loyalty account based upon the shopper identifier, and
train the machine learning algorithm based upon whether the given shopper accepted or denied the enrollment in the retailer loyalty program so that the machine learning algorithm adjusts the shopper value to obtain acceptance of the enrollment in the retailer loyalty program.

2. The shopper valuation system of claim 1 wherein the historical purchase data for the plurality of shoppers and the given shopper each comprises a payment type for each purchase transaction; and wherein the shopper valuation server is configured to determine the shopper value for the given shopper based upon the payment type.

3. The shopper valuation system of claim 2 wherein the payment type comprises a payment card having a brand associated therewith; and wherein the shopper valuation server is configured to determine the shopper value for the given shopper based upon the brand of the payment card.

4. The shopper valuation system of claim 1 wherein the historical purchase data for the plurality of shoppers and the given shopper each comprises a product category associated with each product purchased; and wherein the shopper valuation server is configured to determine the shopper value based upon the product categories.

5. The shopper valuation system of claim 1 wherein the payment is in the form of a digital coupon having a redeemable value toward a purchase at the given retailer.

6. The shopper valuation system of claim 1 wherein the shopper valuation server is configured to communicate the payment to the given shopper based upon enrollment of the given shopper in the retailer loyalty program.

7. The shopper valuation system of claim 1 wherein the shopper valuation server is configured to add the shopper value to a digital wallet associated with the given shopper.

8. A shopper valuation server comprising:
a processor and an associated memory configured to
 obtain historical purchase data associated with a plurality of shoppers at a given retailer,
 apply a machine learning algorithm to determine a corresponding shopper value for each of the plurality of shoppers at the given retailer, each shopper value being a dollar value representation of a value of the corresponding shopper to the given retailer,
 obtain historical purchase data associated with a given shopper at the given retailer,
 apply the machine learning algorithm to determine a shopper value for the given shopper based upon the historical purchase data for the given shopper, the corresponding shopper values for each of the plurality of shoppers, and the historical purchase data for the plurality of shoppers,
 update the machine learning algorithm based upon the shopper value for the given shopper to train the machine learning algorithm to assign shopper values to further given shoppers,
 generate and communicate a notification to a user device associated with the given shopper soliciting the given shopper to accept or deny enrollment in a retailer loyalty program for payment to the given shopper of the shopper value for the given shopper,
 generate a shopper identifier for a loyalty account associated with the given shopper based upon enrollment of the given shopper in the retailer loyalty program, and assign the shopper value for the given shopper to the loyalty account based upon the shopper identifier, and
 train the machine learning algorithm based upon whether the given shopper accepted or denied the enrollment in the retailer loyalty program so that the machine learning algorithm adjusts the shopper value to obtain acceptance of the enrollment in the retailer loyalty program.

9. The shopper valuation server of claim 8 wherein the historical purchase data for the plurality of shoppers and the given shopper each comprises a payment type for each purchase transaction; and wherein the processor is configured to determine the shopper value for the given shopper based upon the payment type.

10. The shopper valuation server of claim 9 wherein the payment type comprises a payment card having a brand associated therewith; and wherein the processor is configured to determine the shopper value for the given shopper based upon the brand of the payment card.

11. The shopper valuation server of claim 8 wherein the historical purchase data for the plurality of shoppers and the given shopper each comprises a product category associated with each product purchased; and wherein the processor is configured to determine the shopper value based upon the product categories.

12. The shopper valuation server of claim 8 wherein the payment is in the form of a digital coupon having a redeemable value toward a purchase at the given retailer.

13. The shopper valuation server of claim 8 wherein the processor is configured to communicate the payment to the given shopper based upon enrollment of the given shopper in the retailer loyalty program.

14. A method of valuating a shopper comprising:
using a shopper valuation server to
 obtain historical purchase data associated with a plurality of shoppers at a given retailer,
 apply a machine learning algorithm to determine a corresponding shopper value for each of the plurality of shoppers at the given retailer, each shopper value being a dollar value representation of a value of the corresponding shopper to the given retailer,
 obtain historical purchase data associated with a given shopper at the given retailer,
 apply the machine learning algorithm to determine a shopper value for the given shopper based upon the historical purchase data for the given shopper, the corresponding shopper values for each of the plurality of shoppers, and the historical purchase data for the plurality of shoppers,
 update the machine learning algorithm based upon the shopper value for the given shopper to train the machine learning algorithm to assign shopper values to further given shoppers,
 generate and communicate a notification to a user device associated with the given shopper soliciting the given shopper to accept or deny enrollment in a retailer loyalty program for payment to the given shopper of the shopper value for the given shopper,
 generate a shopper identifier for a loyalty account associated with the given shopper based upon enrollment of the given shopper in the retailer loyalty program, and assign the shopper value for the given shopper to the loyalty account based upon the shopper identifier, and
 train the machine learning algorithm based upon whether the given shopper accepted or denied the enrollment in the retailer loyalty program so that the machine learning algorithm adjusts the shopper value to obtain acceptance of the enrollment in the retailer loyalty program.

15. The method of claim 14 wherein the historical purchase data for the plurality of shoppers and the given shopper each comprises a payment type for each purchase transaction; and wherein using the shopper valuation server comprises using the shopper valuation server to determine the shopper value for the given shopper based upon the payment type.

16. The method of claim 15 wherein the payment type comprises a payment card having a brand associated therewith; and wherein using the shopper valuation server comprises using the shopper valuation server to determine the shopper value for the given shopper based upon the brand of the payment card.

17. The method of claim 14 wherein the historical purchase data for the plurality of shoppers and the given shopper each comprises a product category associated with each product purchased; and wherein using the shopper valuation server comprises using the shopper valuation server to determine the shopper value based upon the product categories.

18. A non-transitory computer readable medium for valuating a shopper, the non-transitory computer readable medium comprising computer executable instructions that when executed by a processor cause the processor to perform operations comprising:

obtaining historical purchase data associated with a plurality of shoppers at a given retailer;

applying a machine learning algorithm to determine a corresponding shopper value for each of the plurality of shoppers at the given retailer, each shopper value being a dollar value representation of a value of the corresponding shopper to the given retailer;

obtaining historical purchase data associated with the given shopper at the given retailer;

applying the machine learning algorithm to determine a shopper value for the given shopper based upon the historical purchase data for the given shopper, the corresponding shopper values for each of the plurality of shoppers, and the historical purchase data for the plurality of shoppers;

updating the machine learning algorithm based upon the shopper value for the given shopper to train the machine learning algorithm to assign shopper values to further given shoppers;

generating and communicating a notification to the user device soliciting the given shopper to accept or deny enrollment in a retailer loyalty program for payment to the given shopper of the shopper value for the given shopper;

generating a shopper identifier for a loyalty account associated with the given shopper based upon enrollment of the given shopper in the retailer loyalty program, and assigning the shopper value for the given shopper to the loyalty account based upon the shopper identifier; and     training the machine learning algorithm based upon whether the given shopper accepted or denied the enrollment in the retailer loyalty program so that the machine learning algorithm adjusts the shopper value to obtain acceptance of the enrollment in the retailer loyalty program.

19. The non-transitory computer readable medium of claim 18 wherein the historical purchase data for the plurality of shoppers and the given shopper each comprises a payment type for each purchase transaction; and wherein the operations comprise determining the shopper value for the given shopper based upon the payment type.

20. The non-transitory computer readable medium of claim 19 wherein the payment type comprises a payment card having a brand associated therewith; and wherein the operations comprise determining the shopper value for the given shopper based upon the brand of the payment card.

21. The non-transitory computer readable medium of claim 18 wherein the historical purchase data for the plurality of shoppers and the given shopper each comprises a product category associated with each product purchased; and wherein the operations comprises determining the shopper value based upon the product categories.

* * * * *